United States Patent
Ko (10) Patent No.: US 7,532,817 B1
(45) Date of Patent: May 12, 2009

(54) FIBER OPTIC LINK PROTECTION APPARATUS

(75) Inventor: Jimmy Ko, San Leandro, CA (US)

(73) Assignee: LighTech Fiberoptics, Inc., San Leandro, CA (US)

( * ) Notice: Subject to any disclaimer, the term of this patent is extended or adjusted under 35 U.S.C. 154(b) by 503 days.

(21) Appl. No.: 10/880,402

(22) Filed: Jun. 29, 2004

(51) Int. Cl.
 H04B 10/08 (2006.01)
 H04J 14/02 (2006.01)
(52) U.S. Cl. .................... 398/7; 398/5; 398/20
(58) Field of Classification Search .......... 398/5, 398/7, 20
 See application file for complete search history.

(56) References Cited

U.S. PATENT DOCUMENTS

| | | | |
|---|---|---|---|
| 5,327,275 A | 7/1994 | Yamane et al. | 359/117 |
| 5,442,623 A | 8/1995 | Wu | 370/16.1 |
| 5,777,761 A * | 7/1998 | Fee | 398/7 |
| 5,896,474 A | 4/1999 | Van Deventer et al. | 385/24 |
| 6,016,219 A * | 1/2000 | Fatehi et al. | 359/341.43 |
| 6,226,111 B1 | 5/2001 | Chang et al. | 359/119 |
| 6,301,254 B1 | 10/2001 | Chan et al. | 370/397 |
| 6,414,765 B1 | 7/2002 | Li et al. | 359/110 |
| 6,477,288 B1 | 11/2002 | Sato | 385/16 |
| 6,504,963 B1 | 1/2003 | Fang et al. | 385/16 |
| 6,512,611 B1 | 1/2003 | Phelps et al. | 359/110 |
| 2001/0021045 A1* | 9/2001 | Tervonen et al. | 359/110 |
| 2001/0046074 A1* | 11/2001 | Kakizaki et al. | 359/110 |
| 2002/0080440 A1 | 6/2002 | Li et al. | 359/110 |
| 2002/0097461 A1* | 7/2002 | Patel et al. | 359/110 |
| 2003/0025956 A1 | 2/2003 | Li et al. | 359/110 |
| 2003/0081295 A1* | 5/2003 | Kamura | 359/174 |

OTHER PUBLICATIONS

Channel Protection in WDM Mesh Networks, Gadiraju, et al., IEEE Workshop on High Performance Switching and Routing, 2001 IEEE, pp. 26-30.
"Generalized Loop-back Recovery In Optical Mesh Networks", Medard, et al., IEEE/ACM Trans. on Networking, vol. 10, Issue: 1, Feb. 2002, IEEE, pp. 153-164.
"On Available Bandwidth in FDDI-Based Reconfigurable Networks," Kamat, et al., Proc. IEEE 13th INFOCOM '94—Networking for Global Comm., Jun. 1994, vol. 3, pp. 1390-1397.
"Optimal Spare Capacity Design for Various ATM Protection Switching Methods," Bauschert, et al., IEEE Int'l Conf. on Comm. (ICC 97 Montreal)—'Towards the Knowledge Millemium', 1997, vol. 1, pp. 293-298.

* cited by examiner

Primary Examiner—Nathan M Curs
(74) Attorney, Agent, or Firm—Saile Ackerman LLC; Stephen B. Ackerman; Billy Knowles (57) ABSTRACT

A fiber optic protection apparatus includes a first optical switch, a first fault detection device, and first switch control device. The first optical switch is placed at the reception node of an optical link and has a primary input port connected to a primary optical transmission path. A secondary input port is connected to one secondary optical transmission path. The first fault detection device is in communication with the primary optical transmission path to identify a fault within the primary optical transmission path and to generate a fault signal indicating type or location of the fault. The fault signal is transferred to the first switch control device that is in communication with the optical switch. This causes the optical switch to connect one of the secondary optical transmission paths to the reception node when the fault signal indicates that the primary optical transmission path has a fault.

5 Claims, 7 Drawing Sheets

FIBER OPTIC LINK PROTECTION APPARATUS

BACKGROUND OF THE INVENTION

1. Field of the Invention

This invention relates generally to optical communication networks. More particularly, this invention relates to optical communication networks having a primary optical transmission path and a secondary or protection optical transmission path between nodes of the network. Even more particularly, this invention relates to apparatus and methods for detecting a fault within the primary optical transmission path and automatically transferring optical signals being conveyed on the primary optical transmission path to the secondary or protection optical transmission path.

2. Description of Related Art

In optical communication networks, reliability of the network is increased by placing an active or primary optical transmission path or cable and a secondary redundant or protection optical transmission path or cable from a transmission node to a reception node. In such networks as Synchronous Optical Networking (SONET), the nodes are distributed and connected in a ring fashion. The primary ring carries the optical signals with a secondary ring being routed between the nodes of the network to provide the necessary redundancy. If a link within a ring of the primary ring has a fault, the node detects the fault and re-routes the traffic on the ring to the secondary ring, such that the fault in the primary ring is by-passed and the network remains operational.

Other networks simply provide the primary and secondary optical transmission path between two nodes. The optical signals are conveyed on the primary optical transmission path during normal operation and if a fault occurs on the primary optical transmission path, the optical signals are routed to the secondary or protection optical transmission paths. The optical signals are detected, recovered, and decoded to determine whether a fault has occurred. A multiplexer is used to change the selection of the primary optical transmission path to the protection optical transmission path when a fault is detected. By having the fault detection occur in the receiving node electronic, time elapses and the communicated messages within the optical signals maybe lost or require extensive resending diminishing the performance of the network.

"Channel Protection in WDM Mesh Networks", Gadiraju, et al., IEEE Workshop on High Performance Switching and Routing, 2001, IEEE, pp. 26-30, focuses on a channel protection technique against single failures within reliable optical link networks with or without wavelength converters. The protection technique is introduced based on the 1:N spare capacity assignment and has been incorporated in routing and wavelength assignment and network cost optimization. The method involves changing the protection wavelength after each failure.

"Generalized Loop-Back Recovery In Optical Mesh Networks", Medard, et al., IEEE/ACM Transactions on Networking, Volume: 10, Issue: 1, February 2002, IEEE, pp. 153-164 details a novel scheme for performing loop-back in optical mesh networks. Algorithms are detailed that perform recovery for link failure and generalized loop-back recovery for node failure.

"On Available Bandwidth In FDDI-Based Reconfigurable Networks", Kamat, et al., Proceedings IEEE 13th INFOCOM '94—Networking for Global Communications, June, 1994, vol. 3, pp. 1390-1397 details an FDDI-based reconfigurable network (FBRN) that can survive multiple faults. An FBRN consists of multiple FDDI trunk rings and has the ability to reconfigure itself in the face of extensive damage.

"Optimal Spare Capacity Design For Various Protection Switching Methods In ATM Networks", Frisanco, et al., IEEE International Conference on Communications (ICC 97 Montreal)—'Towards the Knowledge Millennium', 1997, vol. 1, pp. 293-298 describes various protection switching methods for ATM networks and presents mathematical models that can be used to determine globally optimal restoration paths and to define spare capacities in the network.

U.S. Pat. No. 5,327,275 (Yamane, et al.) illustrates a switching system for optical communication between first and second optical terminal stations. Optical transmission lines connect first and second optical terminals to their respective working optical transmission lines. A protection piece of optical terminal equipment is connected to the protection optical transmission line. Bidirectional optical signal paths are provided to the corresponding working pieces of optical terminal equipment.

U.S. Pat. No. 5,442,623 (Wu) teaches a method of operation for a self-healing, passive protected ring network. The ring network includes a plurality of active nodes. To make a working ring, these nodes are interconnected. In order to correct a possible failure in the optical fibers or nodes of the working ring, the optical switches are set to connect the protection ring to the nodes on either side and to bypass all the other nodes.

U.S. Pat. No. 5,896,474 (Van Deventer, et al.) describes a passive optical-connection network that has a protection configuration consisting of at least 2 sub-networks. Each of these sub-networks is comprised of an access node, a feed network, and a tree-shaped branched access network.

U.S. Pat. No. 6,226,111 (Chang, et al.) defines a cross-connect for a multi-ring, multi-channel telecommunications network, especially for a wavelength-division multiplexed (WDM) optical network. Each of the interconnected rings is self-healing because it has a redundant counter-rotating ring or excess capacity on pairs of counter-rotating rings.

U.S. Pat. No. 6,301,254 (Chan, et al.) illustrates a method and apparatus for the robust implementation and protection of Asynchronous Transfer Mode (ATM) traffic over a Synchronous Optical Network (SONET) unidirectional Path Switched Ring (UPSR). The traditional SONET bridging function is eliminated for the ATM traffic in favor of a selector function.

U.S. Pat. No. 6,414,765 (Li, et al.) describes a protection switch for use in a two-fiber optical channel shared protection ring. It includes an electrical switching circuit coupled to an optical signal monitor. The electrical switching circuit includes modular switching fabrics that respond to fault condition alarms provided by the optical signal monitor. Each modular switching fabric is versatile because it includes a ring switch mode that is responsive to the multi-wavelength channel failures, and a span switch mode that is responsive to the single wavelength channel failures.

U.S. Pat. No. 6,512,611 (Phelps, et al.) describes a method of deactivating protection fiber resources in an existing optical interconnected ring network or system. The invention uses 1:N protection principles to provide a single protection path on spans of interconnecting nodes common to two or more optical rings.

U.S. Patent Application 2003/0025956 (Li, et al.) provides a protection switch located at a node in a two-fiber optical channel protection ring. The protection switch includes a wavelength selective switch (WSS) coupled to the two-fiber optical channel protection ring. The WSS is configured to selectively drop at least one wavelength channel in the two-fiber optical channel protection ring. A dynamic spectral equalizer (DSE) is coupled to the two-fiber optical channel protection ring. The DSE is configured to substantially block wavelengths corresponding to at least one wavelength channel, and to optically manage at least one express wavelength channel not corresponding to the at least one wavelength channel.

U.S. Patent Application 2002/0080440 (Li, et al.) details a protection switch for use in a two-fiber optical channel shared protection ring. It includes an electrical switching circuit coupled to an optical signal monitor. The electrical switching circuit includes modular switching fabrics that respond to fault condition alarms provided by the optical signal monitor. Each modular switching fabric is versatile. It includes a ring switch mode that is responsive to the multi-wavelength channel failures and a span switch mode that is responsive to the single wavelength channel failures.

SUMMARY OF THE INVENTION

An object of this invention is to provide a fiber optic link protection apparatus for maintaining optical communication between two nodes (a transmission node and a reception node) of a fiber optic communication network.

To accomplish at least this object, a fiber optic protection apparatus has a first optical switch, a first fault detection device, and first switch control device. The first optical switch is placed at the reception node of the optical link and has a primary input port connected to a primary optical transmission path and at least one secondary input port. Each secondary input port is connected to one secondary optical transmission path. The optical switch connects the primary optical transmission path to a reception node when the primary optical transmission path has no fault. When the first optical transmission path has a fault, the first optical switch selects one of the secondary inputs to connect one of the secondary optical transmission paths to the reception node. The first fault detection device is in communication with the primary optical transmission path to identify a fault within the primary optical transmission path and to generate a fault signal indicating the fault. The fault signal is transferred to the first switch control device. The first switch control device is in communication with the optical switch and causes the optical switch to connect the primary optical transmission path to the reception node providing there no fault in the primary optical transmission path is indicated by the fault signal. If the fault signal indicates that the primary optical transmission path has a fault, the optical switch connects one of the secondary optical transmission paths to the reception node.

The first fault detection device also may be in communication with the secondary optical transmission paths to determine an occurrence of a fault within the secondary optical transmission path. If there is a fault within the selected secondary optical transmission path, the optical switch control device causes the optical switch to select another of the secondary optical transmission path to be connected to the reception node.

The fiber optic link protection further includes second optical switch, a second fault detection device, and second switch control device. The second optical switch has a primary output port connected to the primary optical transmission path and at least one secondary output port. Each secondary output port is connected to one secondary optical transmission path. The optical switch connects the primary optical transmission path to a transmission node when the primary optical transmission path has no fault. When the first optical transmission path has a fault, the optical switch selects one of the secondary output ports to connect one of the secondary optical transmission paths to the transmission node.

The second fault detection device is in communication with the primary optical transmission path to identify a fault within the primary optical transmission path. The second fault detection device generates a fault signal to indicate the fault has occurred.

The second switch control device communicates with the fault detection device to receive the fault signal. When there is no fault in the primary optical transmission path, the second switch control device sets the fault signal to cause the second optical transmission path to connect the primary optical transmission path to the transmission node. Alternately, if the fault signal indicates that the primary optical transmission path has a fault, the second optical control switch causes the optical switch to connect one of the secondary optical transmission paths to the transmission node.

The fiber optic link protection apparatus has a first fault signal emitter that transmits the fault signal on a selected secondary optical transmission path. The first fault signal emitter is coupled to a first wave domain multiplexer. The first wave domain multiplexer combines the fault signal with a communication signal to simultaneously transmit the fault signal and the communication signal on the selected secondary optical transmission path and thus to communicate the fault signal to the second fault detection device.

Additionally, the fiber optic link protection apparatus has a second fault signal emitter to transmit the second fault signal on a selected secondary optical transmission path. The second fault signal emitter is coupled to a second wave domain multiplexer to combine the fault signal with a communication signal and thus to simultaneously transmit the fault signal and the communication on the primary optical transmission path to communicate the fault signal to the second fault detection device.

In an alternate configuration, the fiber optic link protection apparatus has communication signal couplers placed at an end of the primary optical transmission path and the secondary optical transmission paths of the transmission node that couples a portion of a communication signal to each of the primary and secondary optical transmission paths. The first optical switch switches from the primary optical transmission path to the protection optical transmission path when a fault occurs in the primary optical transmission path. The portion of the optical signal in the protection optical transmission path is then coupled to the reception node.

DETAILED DESCRIPTION OF THE INVENTION

The fiber optic link protection apparatus of this invention is connected to receive an optical signal from a transmission node. The fiber optic link protection apparatus has one input port connected to a primary optical transmission path that is generally a fiber optic cable, but may be any other optical network path such as the open atmosphere. A second input port is connected to a secondary or protection optical transmission path. Again the protection path is generally a fiber optic cable but may be any other optical transmission media such as the open atmosphere. The primary optical transmission path and the protection optical transmission path selectively convey an optical signal from a transmission node to a reception node. The primary optical transmission path is designated at the principal carrier of the optical signal. However, if a fault is detected in the primary optical transmission path, the protection path is then designated to convey the optical signal pending repair of the primary optical transmission path.

Figure 1:
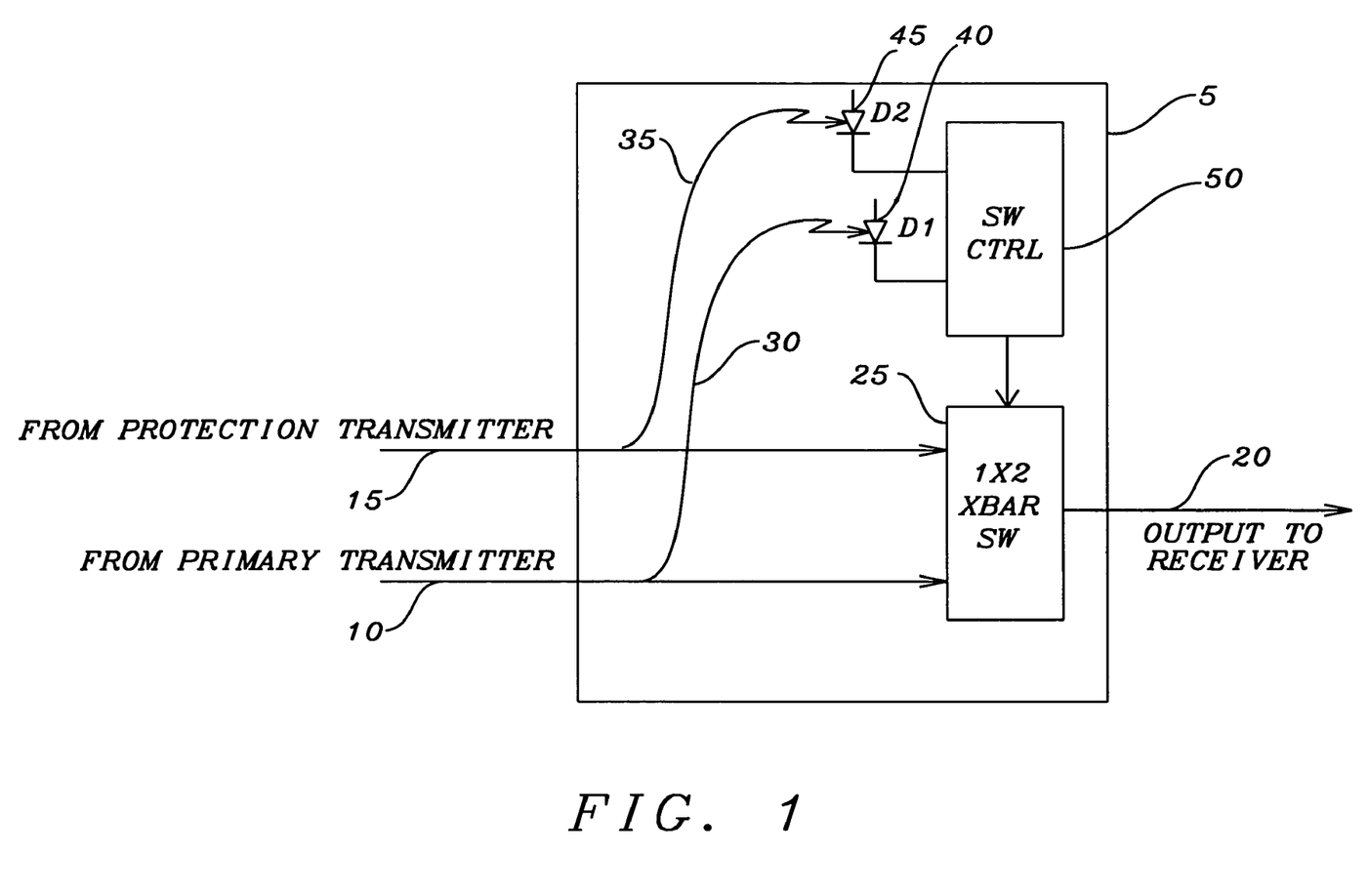
FIG. 1 is a schematic diagram of a first embodiment of a fiber optic link protection apparatus of this invention.

The fiber optic link protection apparatus of this invention detects the presence or absence of the optical signal on the primary and protection optical transmission paths and selects the path having the optical signal for transfer to the reception node. Referring now to FIG. 1 for a more detailed description of the fiber optic link protection apparatus 5 of this invention. The fiber optic link protection apparatus 5 is connected to the primary optical transmission path 10 and the protection optical transmission path 15. The fiber optic link protection apparatus 5 includes a two input/one output crossbar switch 25 that has the primary optical transmission path 10 and the protection optical transmission path 15 as inputs. The crossbar switch 25 has an output 20 connected to the reception node. The primary optical transmission path 10 and the protection optical transmission path 15 each have a tap 30 and 35 which provides a sampling of any optical signals present on the primary optical transmission path 10 or the protection optical transmission path 15 respectively to the photo-detecting diodes D1 40 and D2 45. The photo-detecting diodes D1 40 and D2 45 provide a sense current to the switch control circuit 50 indicating the presence of the optical signal on the primary optical transmission path 10 and/or the protection optical transmission path 15. The switch control circuit develops a control signal indicating whether the primary optical transmission path 10 or the protection optical transmission path 15 is selected for connection to output 20 of the crossbar switch 25 and then to the reception node.

Figure 2:
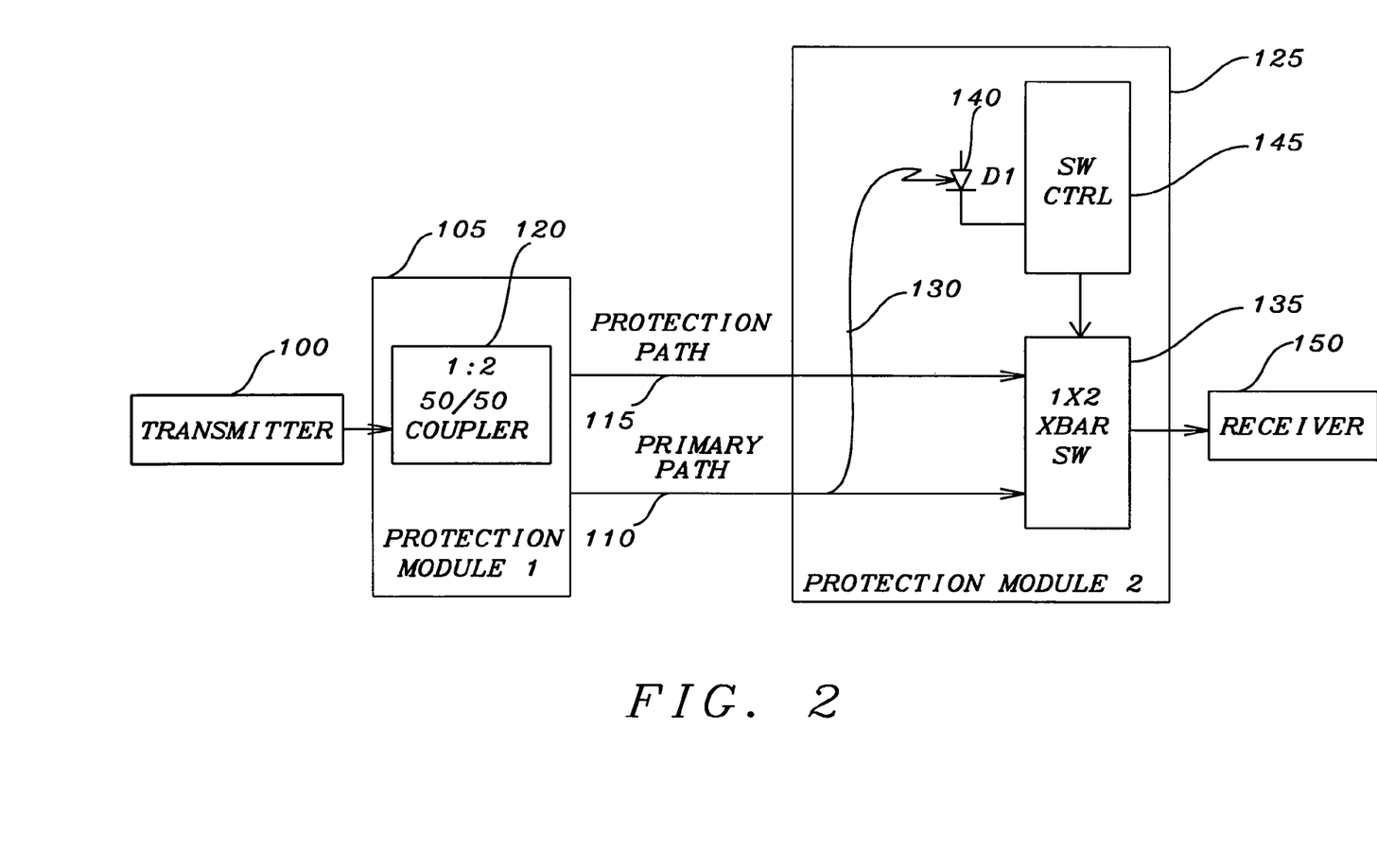
FIG. 2 is a schematic diagram of a fiber optic network link employing the fiber optic link protection apparatus of this invention.

A first embodiment of an optical link between two nodes of a network is shown in FIG. 2. A first node has a transmitter 100 that is to convey the optical signal from the first node. The output of the transmitter 100 is connected to a first protection module 105. The first protection module 105 has an optical coupler that divides the optical signal into equal portions that are to be conveyed on the primary optical transmission path 110 and the protection optical transmission path 115. The primary optical transmission path 110 and the protection optical transmission path 115 are connected to the second protection module 125, which in turn is connected to the receiver 150 of a second node. The primary optical transmission path 110 and the protection optical transmission path 115 are connected to the two input/one output crossbar switch 135 of the second protection module 125. The output of the crossbar switch 135 is connected to the receiver 150 of the second node. The optical signal present on the primary optical transmission path 110 is normally selected as the path for the transmission of the optical signal to the receiver 150. The protection optical transmission path 115 acts as a redundant path that that is engaged only in the event of a fault or failure in the primary optical transmission path 110.

Since the primary optical transmission path 110 has the highest priority for the conveyance of the optical signal, it is the path which is monitored for the existence of the optical signal. In this embodiment, the fiber optic link protection apparatus 125 has a single tap 130 to the primary optical transmission path 110 to provide a sampling of the optical signal to the photodiode D1 140. If the optical signal is present on the primary optical transmission path 110, the photodiode D1 140 provides a sense current indicating the presence of the optical signal to the switch control circuit 145. If there is no sense current in the photodiode D1 140, then the optical signal is not present in the primary optical transmission path 110. If the sense current of the photodiode D1 140 indicates the absence of the optical signal on the primary optical transmission path 110, the switch control circuit 145 generates a control signal instructing the crossbar switch 135 to switch from the primary optical transmission path 110, as the source of the optical signal to the protection optical transmission path 115 to provide the optical signal to the receiver 150 of the reception node.

It should be noted that a second photodiode may be used to detect the presence of the optical signal on the protection optical transmission path 115. This allows for detection of faults on the primary optical transmission path 110 and the protection optical transmission path 115. Thus the primary optical transmission path 110 and the protection optical transmission path 115 would have equal priority with one path being active until a fault occurs and the other path activated. The fault could then be repaired or the transmission media (cabling) of the path replaced and the activated path would remain activated until another fault occurred.

The structure as shown in FIG. 2 lends itself to implementation on unidirectional networks such as loops or rings. In such configurations, a first node has a transmitter 100 connected to the receiver 150 of an adjacent second node. The second node would have a transmitter 100 connected to a receiver 150 of third node. This arrangement locates nodes such that the transmitter of one node is connected to the receiver of another node, until the transmitter of a last node is connected to the receiver of the first node. Alternately, each node may have a transmitter and receiver that are connected to a transmitter and receiver of an adjacent node. Thus each node has a transmitter and receiver for connection to each adjacent node. The number of transmitters and receivers is dependent upon the number of nodes that are adjacent to a given node.

Figure 3:
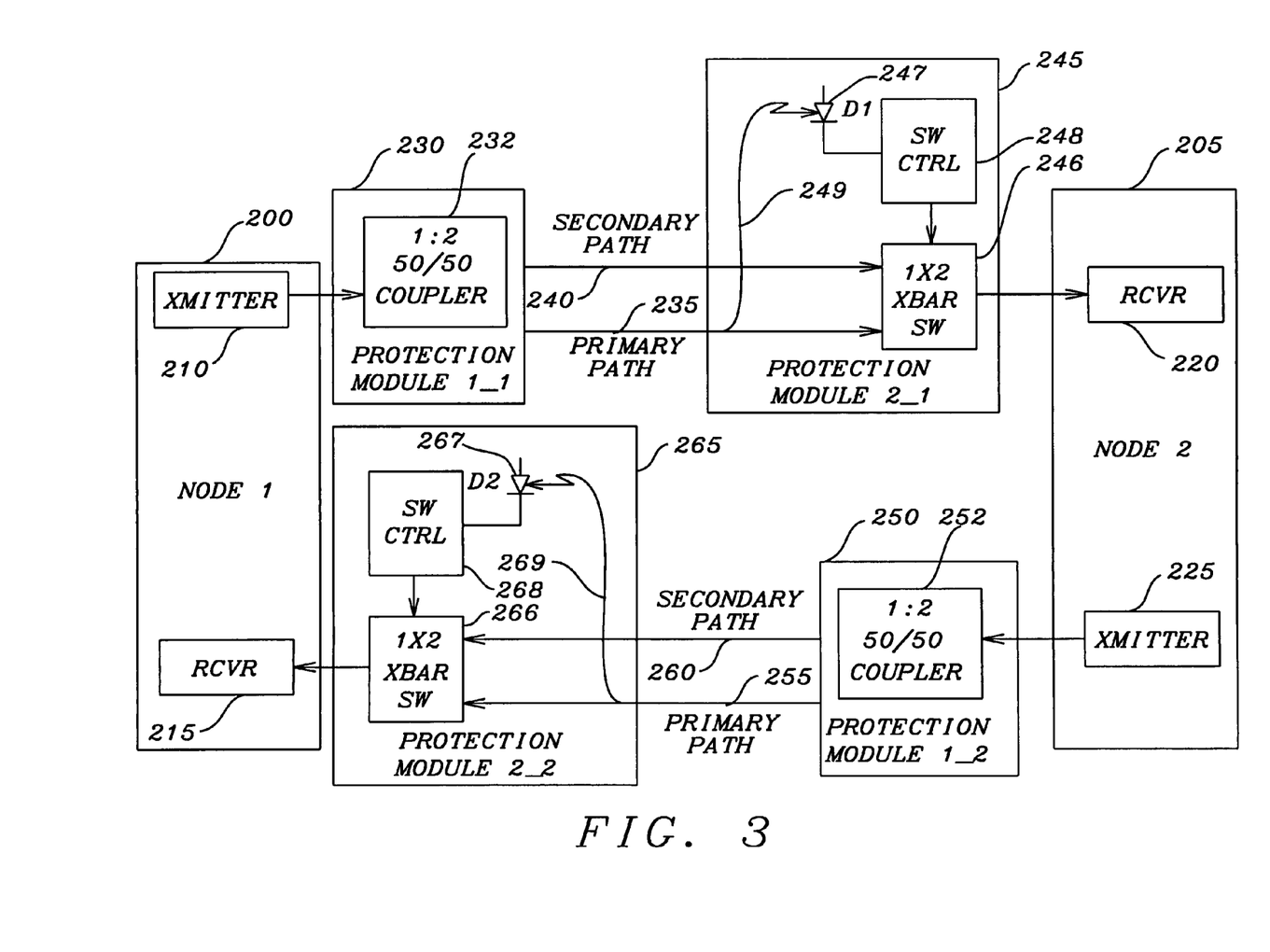
FIG. 3 is a schematic diagram of a bi-directional fiber optic link employing the fiber optic link protection apparatus of this invention.

Refer now to FIG. 3 for a discussion of a bidirectional connection of two nodes of a communication network. The first node 200 and the second node 205 each have a transmitter (210 and 220) and a receiver (215 and 225). The transmitters 210 and 220 format, encode, and generate the optical signals that are acquired by the receivers 215 and 225. The receivers 215 and 225 recover, retime, reconstruct, and then decode the optical signals. The transmitter 210 of the first node 200 is connected to its first protection module 230. The first protection module as described in FIG. 2 has an optical coupler 232 that divides the optical signal into equal portions that are to be conveyed on the primary optical transmission path 235 and the secondary or protection optical transmission path 240. This provides the network connection from the first node 200 to the second node 205. The primary optical transmission path 235 and the secondary optical transmission path 240 are in turn connected through a second protection module 245 to the receiver 220. The primary optical transmission path 235 and the secondary or protection optical transmission path 240 are connected to the two input/one output crossbar switch 246 of the second protection module 245. The output of the crossbar switch 246 is connected to the receiver 220 of the second node 205. The optical signal present on the primary optical transmission path 235 is normally selected as the path for the transmission of the optical signal to the receiver 220. The secondary optical transmission path 240 acts as a redundant path that is engaged only in the event of a fault or failure in the primary optical transmission path 235.

The primary optical transmission path 235 from the first node 200 to the second node 205 has a tap 249 that samples the presence of the optical signal in the primary optical transmission path 235. The sampling of the optical signal impinges upon the photodiode 247 to provide a sense current to the switch control circuit 248. If the absence of the sense current indicates a fault on the primary optical transmission path 235, the switch control circuit 248 provides a control signal to the crossbar switch 246 instructing the crossbar switch 246 to transfer the connection of the receiver 220 of the second node 205 from the primary optical transmission path 235 to the secondary optical transmission path 240. The primary optical transmission path 235 may then be repaired and its connection resumed to the receiver 220.

The transmitter 225 of the second node 205 is connected to its first protection module 250. The first protection module as described in FIG. 2 has an optical coupler 252 that divides the optical signal into equal portions that are to be conveyed on the primary optical transmission path 255 and the secondary or protection optical transmission path 260. This provides the network connection from the second node 205 to the first node 200. The primary optical transmission path 255 and the secondary optical transmission path 260 are in turn connected through a second protection module 265 to the receiver 215. The primary optical transmission path 255 and the secondary or protection optical transmission path 260 are connected to the two input/one output crossbar switch 266 of the second protection module 265. The output of the crossbar switch 266 is connected to the receiver 215 of the first node 215. The optical signal present on the primary optical transmission path 255 is normally selected as the path for the transmission of the optical signal to the receiver 215. The secondary optical transmission path 260 acts as a redundant path that that is engaged only in the event of a fault or failure in the primary optical transmission path 255.

The primary optical transmission path 255 from the second node 205 to the first node 200 has a tap 269 that samples the presence of the optical signal in the primary optical transmission path 255. The sampling of the optical signal impinges upon the photodiode 267 to provide a sense current to the switch control circuit 268. If the absence of the sense current indicates a fault on the primary optical transmission path 255, the switch control circuit 268 provides a control signal to the crossbar switch 266 instructing the crossbar switch 266 to transfer the connection of the receiver 215 of the first node 200 from the primary optical transmission path 255 to the secondary optical transmission path 255. The primary optical transmission path 255 may then be repaired and its connected resumed to the receiver 215 after the repair.

The optical couplers of FIGS. 2 and 3 provide a protection solution with a lower cost. The lower cost is offset by a higher insertion loss or degradation of the optical signal. To eliminate the higher insertion loss, an optical switch maybe added at both nodes of the optical network link. To control the switching of the nodes, an optical communication signal is transferred from the first node to the second and an optical control or sense signal is transferred from the second or reception node to the first or transmitting node. The control signal may include a semaphore to control the optical switch of the transmission node on the protection optical transmission path or may have a sense optical signal that is detected at the transmission node to determine the functioning of the primary optical transmission path.

Figure 4A:
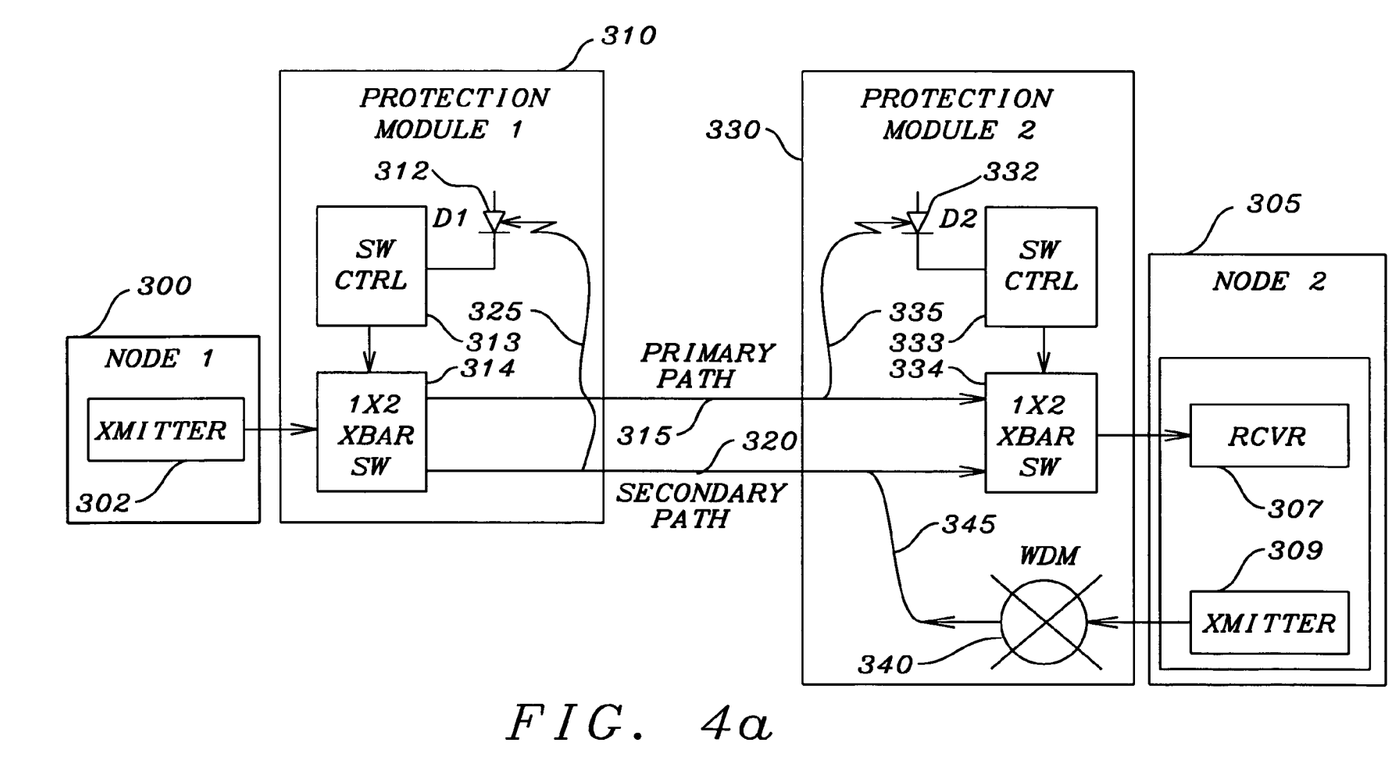
FIGS. 4a and 4b are schematic diagrams of a fiber optic link employing the fiber optic link protection apparatus of this invention.

Refer now to FIG. 4a for a discussion of the use of a control signal with a semaphore message providing the functioning of the primary optical transmission path. The first node 300 is connected to the first fiber optic link protection apparatus 310. The fiber optic link protection apparatus 310, in turn, is connected to the primary optical transmission path 315 and the secondary or protection optical transmission path 320. The distal ends of the primary optical transmission path 315 and the secondary or protection optical transmission path 320 are connected to the second fiber optic link protection apparatus 330. The fiber optic link protection apparatus 330 is connected to the second node 305.

The first node 300 has a transmitter 302 that has an output connected to an input of a one input/two output crossbar switch 314. One of the two outputs of the crossbar switch 314 is connected to the primary optical transmission path 315 and the second output of the two outputs of the crossbar switch 314 is connected to the secondary optical transmission path 320. The distal ends of the primary optical transmission path 315 and the secondary or protection optical transmission path 320 are the inputs to the two input/one output crossbar switch 334. The output of the crossbar switch 334 is the input of the receiver 307 of the second node 305.

The second protection module has a tap 335 to the primary optical transmission path 315 to sample the optical signal of the primary optical transmission path 315. The sampling of the optical signal impinges on the photodiode D1 332 to generate a sense current that is passed to the switch control circuit 333. If the sense current is present indicating the functioning of the primary optical transmission path 315, the switch control circuit 333 generates a control signal to set the crossbar switch 334 to connect the primary optical transmission path to the input of the receiver 307. If a fault occurs in the primary optical transmission path 315, the sense current ceases and the control signal is generated to set the crossbar switch 334 to connect the secondary optical transmission path to the receiver 307.

When a fault in the primary optical transmission path 315 is sensed by the photodiode 332, the switch control circuit 333 communicates a notification to the second node 305. The second node 305 has a transmitter connected to a wave domain multiplexer (WDM) 340, which, in turn, is connected to the secondary optical transmission path 320 through the tap 345. A tap 325 of the secondary optical transmission path 320 provides a sampling of any optical signal on the secondary optical transmission path 320 to the photodiode D1 312. The photodiode 312 generates a sense current that is applied to the switch control circuit 313 of the first fiber optic link protection apparatus 310. Configured in this fashion, the notification of the fault detected by the second fiber optic link protection apparatus 330 is transferred as a semaphore to the switch control circuit 313 of the first fiber optic link protection apparatus. This may in its simplest form be the presence of an optical signal on the secondary optical transmission path or may be an error message detailing the fault characteristics.

Figure 4B:
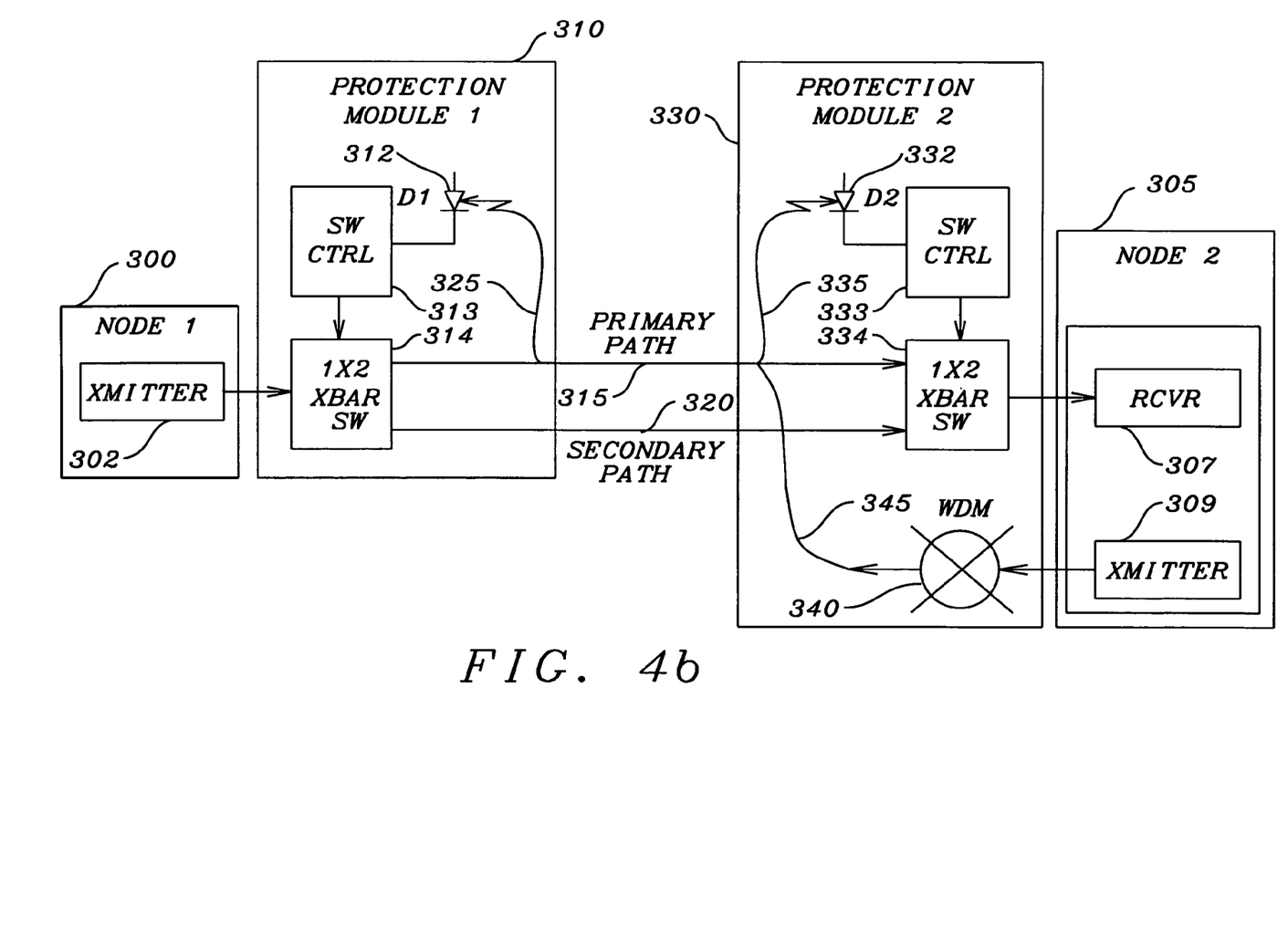

FIG. 4b illustrates a second embodiment of this structure employing a return transmitter and wave domain multiplexer. The fundamental structure of the fiber optic link of FIG. 4b is essentially identical to that of FIG. 4a, except the wave domain multiplexer 340 is now connected to the primary optical transmission path 315 through the tap 345. The transmitter 309 transmits a constant optical signal that does not need to contain any message, but may be modulated for power conservation purposes. The tap 325 is now in the primary optical transmission path 315 rather than the secondary optical transmission path 320 as in FIG. 4a. The constant optical sense signal impinges on the photodiode 312 to create a sense current that is transferred to the switch control circuit 313. If the constant optical sense signal is functioning indicating that there is no fault in the primary optical transmission path 315, the switch control circuit 313 generates a control signal that is communicated to the crossbar switch 314 to connect the transmitter 302 of the first node 300 to the primary optical transmission path 315. If the constant optical sense signal indicates that the primary optical transmission path 315 has a fault, the switch control circuit 313 generates and transfers a control signal to the crossbar switch 314 indicating that the transmitter 302 is to be connected to the secondary optical transmission path 320.

The structure of FIG. 4a requires circuitry and control in the second node 305 to generate the necessary semaphore indicating the failure of the primary optical transmission path 315. Whereas, FIG. 4b has a simpler configuration allowing the first node to determine the existence of a fault in the primary optical transmission path 315 with no external information other than the constant optical sense signal from the second node 305.

Figure 5:
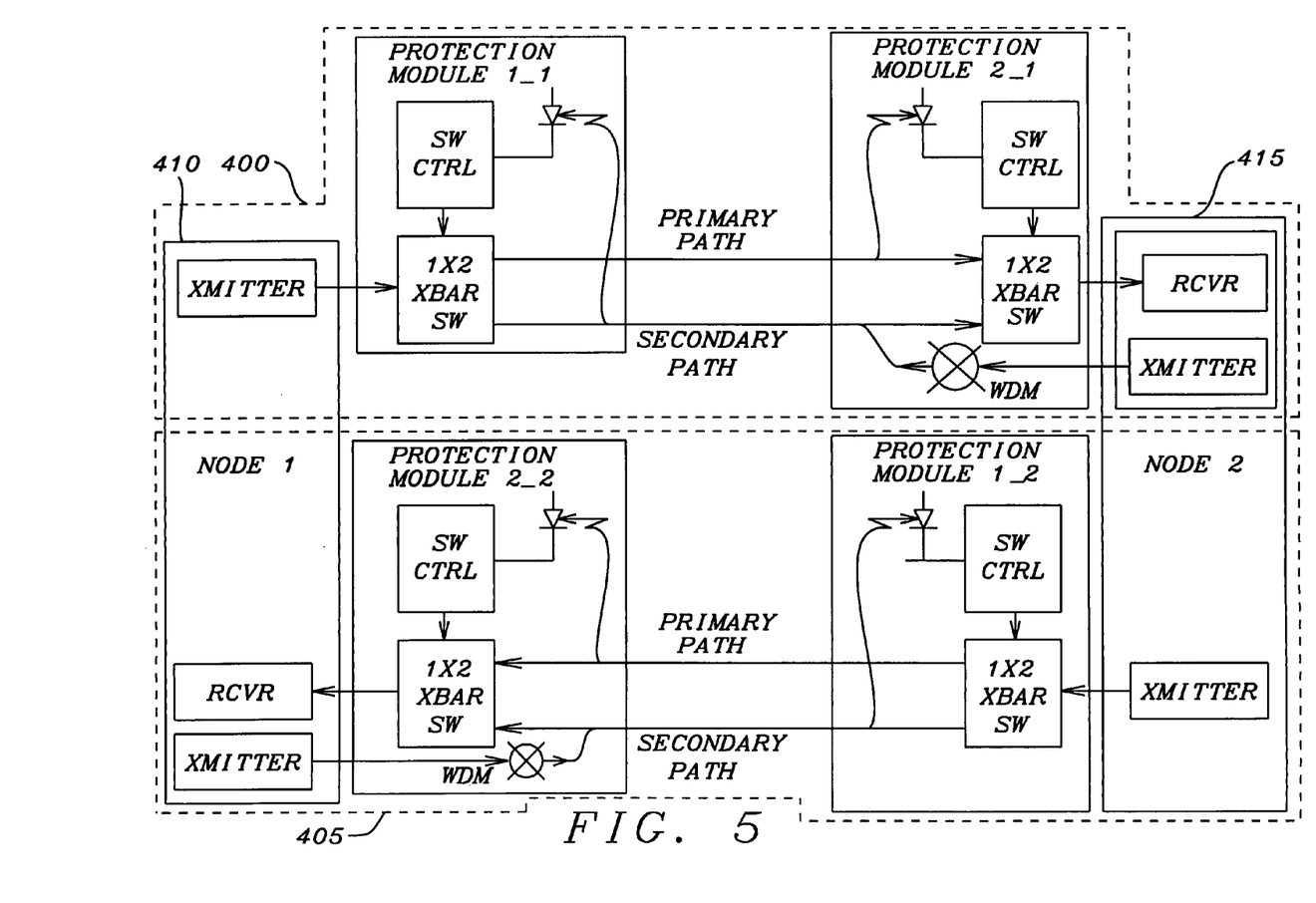
FIG. 5 is a schematic diagram of a first embodiment of a fiber optic network employing the fiber optic link protection apparatus of this invention.

FIG. 5 illustrates a fiber optic link connecting two nodes 410 and 415 of a communication network that have the fiber optic link protection apparatus of this invention as shown in FIG. 4a. The fiber optic link between the first node 410 and the second node 415 is a bidirectional link with two separate sub-links. The first sub-link 400 transmits an optical signal from the first node 410 to the second node 415 and the second sub-link transmits an optical signal from the second node 415 to the first node 410. The two sub-links are configured and function as the structure of FIG. 4a. If the primary optical transmission path of the first sub-link 400 develops a fault, the second node transmits the semaphore or the sense optical signal to the first fiber optic link protection apparatus of sub-link 400. The crossbar switch then transmits the optical signal on the secondary optical transmission path. Similarly, if the primary optical transmission path of the second sub-link 405 develops a fault, the first node 415 transmits the semaphore or sense optical signal to the second fiber optic link protection apparatus, which transfers the connection of the transmitter of second node 415 from the primary optical transmission path to the secondary optical transmission path.

It should be noted that the secondary or protection paths of FIGS. 1-5 are shown as single paths or connections. However, it is in keeping with the intent of this invention that there are multiple secondary paths with switch control circuits providing the necessary control to one of the secondary paths to convey the optical signal when faults occur on the primary optical transmission path and those secondary paths put into operation.

Figure 6:
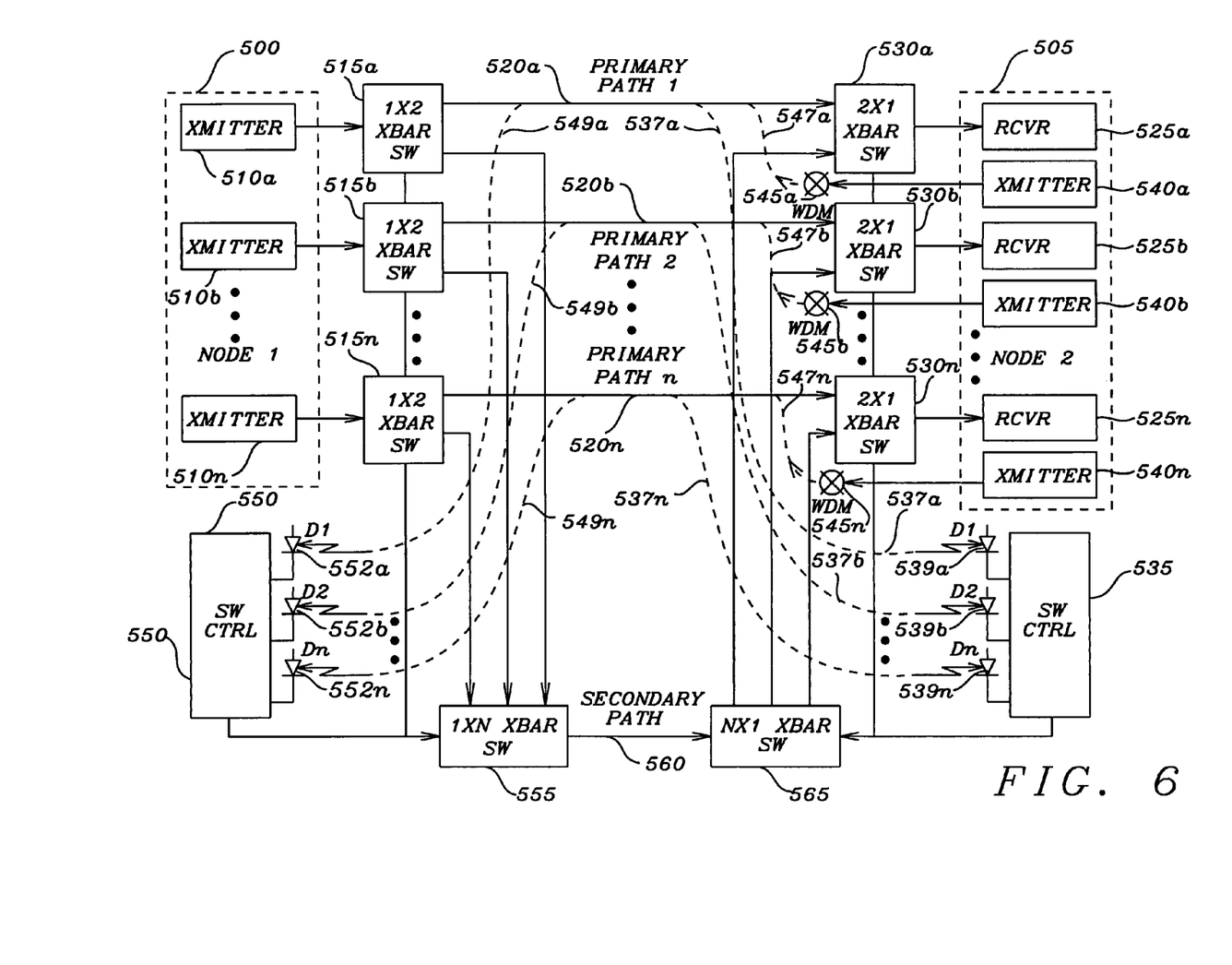
FIG. 6 is a schematic diagram of a second embodiment of a fiber optic network employing the fiber optic link protection apparatus of this invention.

The structure of the optical links of the network of this invention, as described above, illustrate a primary optical transmission path having a matching redundant secondary or protection optical transmission path. The reliability of an optical transmission path determines the necessity of the level of redundancy. Additionally, in order to increase bandwidth between two nodes of an optical communication network, multiple transmitters and receivers maybe used for each node. The optical signals may have interleaved common communication messages or may have many separate messages. The physical configuration remains the same. FIG. 6 illustrates an optic link between two nodes of a network with a single secondary or protection optical transmission path and multiple primary optical transmission paths. The first node 500 has multiple transmitters 510a, 510b, . . . , and 510n whose outputs are each connected to one input/two output crossbar switches 515a, 515b, . . . , and 515n. The primary outputs of each of the crossbar switches 515a, 515b, . . . , and 515n are connected to each of the primary optical transmission paths 520a, 520b, . . . , and 520n. Each primary optical transmission path 520a, 520b, . . . , and 520n is connected to one of the two inputs of a two input/one output crossbar switches 530a, 530b, . . . , and 530n, The output of each of the crossbar switches 530a, 530b, . . . , and 530n is connected to one of the receivers 525a, 525b, . . . , and 525n of the second node 505.

The second output of each of the crossbar switches 515a, 515b, . . . , and 515n is connected to a multiple input/single output crossbar switch 555. The crossbar switch 555 is connected to the secondary or protection optical transmission path 560. The secondary optical transmission path 560 is connected to the input of the one input/multiple output crossbar switch 565. Each output of the crossbar switch 565 is connected to the second input of one of the crossbar switches 530a, 530b, . . . , and 530n.

Each of the primary optical transmission paths 520a, 520b, . . . , and 520n has a tap 537a, 537b, . . . , and 537n connected to transfer a sample of the optical signals present on the primary optical transmission paths 520a, 520b, . . . , and 520n to the photodiodes D1, D2, . . . , and Dn 539a, 539b, . . . , and 539n. If the optical signals are present in each of the primary optical transmission paths 520a, 520b, . . . , and 520n, each of the photodiodes 539a, 539b, . . . , and 539n provides a sense current signal to the switch control circuit 535. If any of the primary optical transmission paths 520a, 520b, . . . , and 520n has a fault, the optical signal for the transmission path is interrupted and the sense current signal ceases. The switch control circuit 535 activates the crossbar switch 530a, 530b, . . . , and 530n connected to the primary optical transmission path 520a, 520b, . . . , and 520n with the fault and connects to its output to the second input that is connected to the crossbar switch 565.

The second node includes transmitters 540a, 540b, . . . , and 640n that provide a constant optical sense signal. Each of the transmitters 540a, 540b, . . . , and 540n is connected to an associated wave domain multiplexer 545a, 545b, and 545n. Each of the wave domain multiplexers 545a, 545b, . . . , and 545n is connected through a tap to the primary optical transmission paths 520a, 520b, . . . , and 520n. At an opposite end of each primary optical transmission paths 520a, 520b, . . . , and 520n, taps 549a, 549b, . . . , and 549n are placed in the primary optical transmission paths 520a, 520b, . . . , and 520n to acquire the constant optical sense signal transmitted from the transmitters 540a, 540b, . . . , and 540n. The sampled optical sense signals impinge upon the photodiodes D1, D2, . . . , and Dn 552a, 552b, . . . , and 552n to create sense current signals that are the inputs to the switch control circuit 550. The switch control circuit 550 is connected to each of the crossbar switches 515a, 515b, . . . , and 515n and the crossbar switch 555. If all the primary optical transmission paths 520a, 520b, and 520n have no faults, then the crossbar switches 515a, 515b, . . . , and 515n have the multiple transmitters 510a, 510b, . . . , and 510n connected to the primary optical transmission paths 520a, 520b, . . . , and 520n. If any of the primary optical transmission paths 520a, 520b, . . . , and 520n have a fault, the one crossbar switch of the crossbar switches 515a, 515b, . . . , and 515n having the fault connects the associated transmitter 510a, 510b, . . . , and 510n connected to the crossbar switch 555. Thus the transmitter 510a, 510b, . . . , and 510n associated with the primary optical transmission path 520a, 520b, . . . , and 520n with the fault is connected to the secondary path 560. This provides the necessary redundant path for the optical signal when one of the primary optical transmission paths 520*a*, 520*b*, . . . , and 520*n* has a fault and ensures that the network maintains operability.

It will be noted that the secondary or protection path 560 is shown as single path or connection. However, it is in keeping with the intent of this invention that there are multiple secondary paths with switch control circuits 535 and 550 providing the necessary control to one of the secondary paths to convey the optical signal when multiple faults occur on the primary optical transmission paths 520*a*, 520*b*, . . . , and 520*n*.

In summary, the apparatus, above, performs a method for maintaining optical communication linkage of multiple transmission nodes with multiple reception nodes. The method provides multiple primary optical transmission paths. Each primary optical transmission path conveys one of the multiple optical signals from one of the transmission nodes to one of the reception nodes. If a fault exists in one of the multiple primary optical transmission paths, at least one protection optical transmission path is provided to convey any one of the multiple optical signals. The optical signals are examined to detect if any of the optical signals has failed to transit any of the primary transmission paths. If any of the optical signals have failed to transit any of the primary paths, an identifying fault signal is declared detailing which of the primary paths has a fault. If a fault exists within one of the primary transmission paths, the optical signal is transferred from the primary transmission path with the fault to one of multiple protection transmission paths.

Detecting the failure of any optical signals to transit any of the primary transmission paths is accomplished by providing a fault detection device. The fault detection device generates the identifying fault signal. The first fault detection device is in communication with each of the primary optical transmission paths to identify the existence of each of the optical signals within any of the primary optical transmission paths. Upon the determination of a fault, the fault detection device generates a fault signal indicating one of the optical signals has not transited one of the primary transmission paths.

When a fault exists within one of the primary transmission paths, the optical signal is transferred from the faulty primary transmission path to one of the multiple protection transmission paths. By receiving the declared fault, it is then possible to identify which of the primary transmission paths had the fault. The transmission node connected to the primary transmission path with the declared fault is then switched to one of the protection transmission paths.

The method further includes detecting whether any of the optical signals have failed to transit any of the protection transmission paths. If any of the optical signals have failed to transit any of the protection paths, declaring that a fault has occurred and identifying which of the protection paths has the fault. If a fault exists within one of the protection transmission paths, the optical signal from the protection transmission path with the fault is transferred to another of multiple protection transmission paths.

A fault sense signal may be transmitted on a selected protection optical transmission path. The fault sense signal is multiplexed with one of the optical signals to simultaneously transmit the fault signal and the optical signals on the selected protection optical transmission path to communicate the fault signal to the transmission node. Alternately, the fault sense signal may be transmitted on the primary optical transmission path, such that the transmission node is able to detect a fault within the primary optical transmission path to ensure that optical signal is transferred to the protection optical path.

A portion of the multiple optical signals may be coupled to one of the primary transmission paths and to one of the protection optical transmission paths. This permits the detection of a fault on the primary optical transmission path and transference to the protection optical path at the reception node with no involvement of the transmission node.

While this invention has been particularly shown and described with reference to the preferred embodiments thereof, it will be understood by those skilled in the art that various changes in form and details may be made without departing from the spirit and scope of the invention.

The invention claimed is:

1. An optical communication system to connect each of a plurality of transmission nodes to a respective one of a plurality of reception nodes, comprising:

a plurality of primary optical transmission paths, each primary optical transmission path conveying one optical signal from one of the transmission nodes to the associated one of the reception nodes;

at least one protection optical transmission path to convey any one optical signal transmitted on one of said plurality of primary optical transmission paths, if a fault exists in one of the plurality of primary optical transmission paths;

a first path selection mechanism in communication with each of the primary transmission paths for sensing a fault/no fault signal at a transmission end of each of the primary transmission paths to detect a fault within one of the primary transmission paths and transfer the optical signal from said primary transmission path having said fault to the at least one protection transmission path; and a second path selection mechanism in communication with each of the primary transmission paths for sensing the optical signal at a receiving end of each of the primary transmission paths to detect a fault within one of the primary transmission paths and transfer the optical signal from said primary transmission path having said fault to the at least one protection transmission paths.

2. The optical communication system of claim 1 wherein said first path selection mechanism comprises:

a plurality of first optical switches, each switch having a primary input port connected to one of the transmission nodes, a primary output port connected to one of the primary optical transmission paths, at least one secondary output port connected to one protection optical transmission path, said optical switch connecting the one transmission node to one of the primary optical transmission paths to the associated one of the reception nodes when said one primary optical transmission path has no fault and to select one secondary output port to connect the one of the transmission nodes to its associated reception node through the at least one of the protection optical transmission path when the one primary optical transmission path connecting the one transmission node to the one reception node has a fault;

a plurality of first fault detection devices, each first fault detection device in communication with one of the primary optical transmission paths to sense the presence or absence of a fault/no fault signal to identify a fault within one of said primary optical transmission paths and to generate a fault signal indicating said fault; and a first switch control device in communication with said fault detection devices to receive the fault signal from each of the first fault detection devices and in communication with said plurality of first optical switches to cause said plurality of first optical switches to connect said plurality of the transmission nodes through said primary optical transmission paths to said associated reception nodes if no fault in said primary optical transmission paths is indicated by said fault signal and to cause one of said optical switches to connect one of the transmission nodes through one protection optical transmission path to its associated reception node when the primary optical path connecting the one of the transmission nodes and its associated reception node has the fault as indicated by the fault signal.

3. The optical communication system of claim 2 further comprising: at plurality of protection optical transmission paths to convey on one of the plurality of protection optical paths any one optical signal transmitted on one of said plurality of primary optical transmission paths, if a fault exists in one of the plurality of primary optical transmission paths, wherein each of the first fault detection devices is in communication with the plurality of protection optical transmission paths to determine an occurrence of one fault within one of the protection optical transmission paths and to cause the optical switch to select another of the protection optical transmission paths to be connected to the reception node having the connection to the primary optical path having the fault.

4. The fiber optic link protection apparatus of claim 2 wherein said second path selection mechanism comprises:

a plurality of second optical switches, each of the second optical switches having a primary input port connected to one of the plurality of primary optical transmission paths, a secondary input port connected to one protection optical transmission path, and one output port connected to one of the reception nodes, said optical switch connecting the one reception node through the one of the plurality of primary optical transmission paths to an associated transmission node when said primary optical transmission path has no fault and to select the secondary input port to connect the one reception node to the at least one protection optical transmission path to the associated transmission node when said primary optical path has a fault;

a plurality of second fault detection devices in communication with the plurality of primary optical transmission paths to sense the presence or absence of the optical signal to identify a fault within any of said primary optical transmission paths and to generate a second fault signal indicating said fault; and a second switch control device in communication with said fault detection devices to receive the second fault signal and in communication with said plurality of second optical switches to cause said second optical switches to connect said transmission nodes through said primary optical transmission paths to said reception nodes, if no fault in said primary optical transmission paths is indicated by said second fault signal and to cause said second optical switch to connect one protection optical transmission path to said corresponding reception node if said second fault signal indicates that one of said primary optical transmission paths has said fault.

5. The fiber optic link protection apparatus of claim 4:

wherein each of the plurality of reception nodes include a fault/no fault signal emitter to transmit the fault/no fault signal on each of said primary optical transmission paths;

wherein second path selection mechanism further comprises a plurality of wave domain multiplexers wherein each of the wave domain multiplexers transmits the fault/no fault signal and the optical communication signal of each primary optical transmission path to communicate the fault/no fault signal to the first fault detection device.

* * * * *

UNITED STATES PATENT AND TRADEMARK OFFICE
CERTIFICATE OF CORRECTION

| | |
|---|---|
| PATENT NO. | : 7,532,817 B1 |
| APPLICATION NO. | : 10/880402 |
| DATED | : May 12, 2009 |
| INVENTOR(S) | : Chun Ming Jimmy Ko |

Page 1 of 1

It is certified that error appears in the above-identified patent and that said Letters Patent is hereby corrected as shown below:

Title page in the Inventor, item (75), delete Inventor, "Jimmy Ko, San Leandro, CA (US)" and replace with -- Chun Ming (Jimmy) Ko --.

Title page in the Assignee, item (73), delete Assignee, "LighTech Fiberoptics, Inc., San Leandro, CA (US)" and replace with -- LIGHTech Fiberoptics, Inc., San Leandro, CA (US) --.

Signed and Sealed this

Sixth Day of October, 2009

David J. Kappos
*Director of the United States Patent and Trademark Office*